US006816858B1

(12) United States Patent
Coden et al.

(10) Patent No.: US 6,816,858 B1
(45) Date of Patent: Nov. 9, 2004

(54) SYSTEM, METHOD AND APPARATUS PROVIDING COLLATERAL INFORMATION FOR A VIDEO/AUDIO STREAM

(75) Inventors: Anni Rosa Coden, Bronx, NY (US); Eric William Brown, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 09/698,894

(22) Filed: Oct. 27, 2000

Related U.S. Application Data

(60) Provisional application No. 60/218,966, filed on Jul. 17, 2000, and provisional application No. 60/193,910, filed on Mar. 31, 2000.

(51) Int. Cl.[7] .............................................. G06F 17/30
(52) U.S. Cl. ............................... 707/5; 707/6; 707/102; 707/104.1; 704/270.1; 386/96
(58) Field of Search ............................. 707/1, 3, 4, 5, 707/6, 102, 104.1, 500, 104; 709/101, 224, 228, 238, 246, 250, 315; 704/9, 10, 270.1, 278, 275, 270; 386/96; 345/278, 2, 952, 440, 629, 764, 765; 380/20, 5; 395/600, 200; 379/67.1

(56) References Cited

U.S. PATENT DOCUMENTS

| 5,465,370 A | | 11/1995 | Ito et al. | |
|---|---|---|---|---|
| 5,500,920 A | * | 3/1996 | Kupiec | 704/270.1 |
| 5,625,767 A | * | 4/1997 | Bartell et al. | 345/440 |
| 5,786,814 A | * | 7/1998 | Moran et al. | 345/720 |
| 5,832,480 A | | 11/1998 | Byrd, Jr. et al. | |
| 5,835,667 A | * | 11/1998 | Wactlar et al. | 386/96 |
| 5,887,062 A | | 3/1999 | Maeda et al. | |
| 5,890,131 A | | 3/1999 | Ebert et al. | |
| 5,970,460 A | * | 10/1999 | Bunce et al. | 704/278 |
| 6,272,457 B1 | * | 8/2001 | Ford et al. | 704/9 |
| 6,510,468 B1 | * | 1/2003 | Hayne | 709/246 |

OTHER PUBLICATIONS

Allen James et al., Topic Detection and Tracking Pilot Study: Final report. In Proceedings of the DARPA Broadcast News Transcription and Understanding Workshop, pp. 194–218, 1998.*
"Modern Information Retrieval," Baeza–Yates and Ribeiro–Neto, *ACM Press,* New York, 1999.
"Topic Detection and Tracking Pilot Study: Final Report" J. Allan et al. *Proceedings of the DARPA Broadcast News Transcription and Understanding Workshop,* pp. 194–218, 1998.
"Foundations of Statistical Natural Language Processing", *MIT Press,* 1999.
"The Use of Predictive Annotation for Question–Answering in TREC 8" Prager et al., *Proceedings of TREC8, Gaithersburg, MD,* 2000.
"Question–Answering by Predictive Annotation", Prager et al, ACM SIGIR, 2000.

* cited by examiner

*Primary Examiner*—Shahid Alam
*Assistant Examiner*—Fred Ehichioya
(74) *Attorney, Agent, or Firm*—Ohlandt, Greeley, Ruggiero & Perle, L.L.P.; Louis J. Percello

(57) ABSTRACT

A system and method is disclosed for performing Automatic Stream Analysis for Broadcast Information which takes speech audio as input, converts the audio stream into text using a speech recognition system, applies a variety of analyzers to the text stream to identify information elements, automatically generates queries from these information elements, and extracts data from search results that is relevant to a current program. The data is multiplexed into the broadcast signal and transmitted along with the original audio/video program. The system is fully automatic and operates in real time, allowing broadcasters to add relevant collateral information to live programming.

15 Claims, 8 Drawing Sheets

SYSTEM, METHOD AND APPARATUS PROVIDING COLLATERAL INFORMATION FOR A VIDEO/AUDIO STREAM

CLAIM OF PRIORITY FROM ABANDONED PROVISIONAL PATENT APPLICATIONS

This patent application claims priority under 35 U.S.C. §119(e) from abandoned Provisional Patent Application 60/218,966, filed Jul. 17, 2000; the disclosure of which is incorporated by reference herein in its entirety, and from abandoned Provisional Patent Application 60/193,910, filed Mar. 31, 2000; the disclosure of which is incorporated by reference herein in its entirety.

GOVERNMENT RIGHTS STATEMENT

This invention was made with Government support under cooperative agreement number 70NANB5H1174 awarded by the National Institute of Standards and Technology (NIST). The U.S. Government has certain rights in this invention.

CROSS-REFERENCE TO A RELATED PATENT APPLICATION

This patent application is related to commonly-assigned U.S. patent application Ser. No. 09/627,555, filed Jul. 28, 2000, to Bolle et al., entitled "Apparatus, System and Method for Augmenting Video Information Streams with Relevant Information", the disclosure of which is incorporated by reference herein in its entirety.

FIELD OF THE INVENTION

This invention relates generally knowledge management methods and apparatus and, more specifically, the invention relates to knowledge management of information streams to determine knowledge concepts present in a content of an information stream and to determine additional or collateral information that is related to the content of the information stream.

BACKGROUND OF THE INVENTION

An information stream is a source of information where the information has a time-based component, and where the information "flows" from a source to a destination. The most common example of an information stream is spoken discourse (i.e., speech). The speaker is the information source, the listener is the destination, the content of the speech (the actual words) contains or represents the information, and the audible sound pressure wave produced by the speaker's mouth transmits the information from the speaker to the listener. The sound wave travels over time and must be processed in real-time (i.e., heard) by the listener. If the listener does not process the sound wave as it is received, the speech will be lost and the listener will not receive the information.

Other kinds of information streams include, for example, television broadcasts, telephone conversations, and computer network-based communications. An important feature of an information stream is that the information is transmitted over time and must be processed in real-time as it is received. Of course, this processing may include capture of the information (e.g., into a computer file) for further processing off-line at a later date.

Information streams are a valuable resource in the practice of knowledge management. Knowledge management is an activity that includes processes and technologies for capturing intellectual capital and making it easily accessible for reuse and exploitation (see, for example, Davenport and Prusak, "Working Knowledge", Harvard Business School Press, Boston, 1998).

Many knowledge management tools exist that operate on textual information, or documents. The most basic operation is to index and search the documents using a text retrieval system (see, for example, Baeza-Yates and Ribeiro-Neto, "Modem Information Retrieval", ACM Press, New York, 1999). More advanced operations on documents include automatic clustering, automatic classification, and automatic extraction of concepts and named entities from documents. One product that provides tools to perform all of these tasks on a collection of documents is the IBM Intelligent Miner for Text (see U.S. Pat. No. 5,832,480).

All of these previously described document processing tasks may be further refined with user profiles. A user profile describes a particular interest or set of interests on behalf of the user. The profile is used to filter or modify the various document processing tasks so that the results more closely match the interests of the end user.

The convergence of information streams and knowledge management occurs naturally in two important contexts: meetings and data broadcasting. Meetings have a variety of incarnations, with the most common being a face-to-face meeting between two or more individuals. The meeting will minimally include a spoken discourse information stream, and may additionally include other documents, such as an agenda, a visual presentation, and notes (i.e., meeting minutes). Other incarnations of meetings include sales presentations, teleconferences, video conferences, email exchanges, chat sessions, and help desk call sessions. For prior art related to meetings, see U.S. Pat. Nos. 5,890,131, 5,786,814, 6,018,346 and 5,465,370.

Data broadcasting is the process of encoding data in a television broadcast signal (in addition to the traditional video and audio signals). Both analog and newer digital television channels have unused bandwidth that can be used to transmit arbitrary data. This data may or may not be related to the accompanying audio/video broadcast. With the incorporation of data broadcasting, a television broadcast signal becomes a very rich information stream comprising audio, video, and data. For prior art related to data broadcasting, see U.S. Pat. Nos. 5,887,062 and 6,031,578.

The emergence of the World Wide Web (WWW or simply Web) as an information and entertainment media is generating many changes in the more traditional media of broadcast television. In particular, broadcasters have begun to link these two media together to create a much richer television viewing experience. For example, television programs may display URLs that point to Web sites related to the program. A next phase of linkage will enable set top boxes and TV tuner computer cards to become more prevalent. Such devices will allow broadcasters to send Web content with the television broadcast and display the audio/video program in an integrated fashion with the Web content.

This tighter integration of broadcast television and the Web presents a number of challenges, with one of the more difficult challenges being how to identify the information that should be broadcast with the television program. Currently, program producers manually identify the information to be broadcast. This process may be supported by software that aids in scheduling the data broadcast, or software that automatically accesses databases to obtain, for example, stock quotes. Nevertheless, the overall information seeking and selection process is manual.

This approach has several disadvantages. First, it is slow and expensive. Second, there is no mechanism to tie additional information into a live broadcast, where the time at which a particular topic is discussed is not known beforehand. Currently, if a significant event (e.g., a natural disaster occurs during a broadcast of the daily news), the producers have a difficult time just reporting the event, and in general may have no time to find background information. Third, with the advent of set top boxes, users may wish to customize the information displayed on their TV set. For example, one person may wish to see only sports-related information, while another may wish to choose news that is related to a specific geographic location.

One problem of particular interest to the teachings of this invention is most closely related to efforts related to Topic Detection and Tracking (TDT). Reference in this regard can be had to J. Allan, J. Carbonell, G. Doddington, J. Yamron, and Y. Yang, "Topic Detection and Tracking Pilot Study: Final Report". *Proceedings of the DARPA Broadcast News Transcription and Understanding Workshop*, pp. 194–218. In TDT, the goal is to analyze news broadcasts (text articles or text transcripts generated automatically from audio and video) and to identify previously unseen news events, or topics. Topics are then tracked by identifying subsequent news stories covering the same event. This is accomplished using a variety of off-line text processing, language modeling, and machine learning algorithms. However, TDT is not a real-time system, so it cannot annotate a live broadcast with collateral information, and furthermore is basically limited to topic detection.

As was stated above, one information retrieval and text analysis technique includes the IBM Intelligent Miner for Text, "www-4.ibm.com/software/data/iminer/fortext/". Reference may also be had to C. D. Manning and H. Schutze, "Foundations of Statistical Natural Language Processing", *MIT Press*, 1999. However, neither of these approaches is specifically adapted to support on-line processing of streaming text data.

A number of commercial systems exist that support the manual addition of data to a broadcast signal (see, for example, Wave Systems Corporation and SkyStream Networks). These systems allow program producers to select, format, and schedule the delivery of data with the broadcast. However, these systems require the manual identification of collateral data.

An important problem that has not heretofore been adequately addressed relates to the identification of collateral information in real time based on the words spoken during a broadcast (or any other spoken discourse).

There are several challenges in this area. Although voice recognition has improved tremendously over the last few years, it cannot be expected that a voice recognition system will deliver a perfect transcript. Transcript quality is by far the best when the voice recognition system is trained with the voice of the speaker and the recording is made in a quiet environment with appropriate microphones. Unfortunately, in a broadcast setting (and many other similar settings) such optimal circumstances are not available. Instead, there may be many speakers, with some recording from a studio and others from the field. Furthermore, background noise and sub-optimal microphones contribute to the deterioration of the transcript quality.

The quality of the transcript has tremendous implications on the methods that can be applied to analyze it. The effectiveness of traditional text analysis tools decreases as the quality of the transcript decreases. Some of the issues that arise include lack of punctuation, lack of grammatical structure, and mis-recognized words (e.g., wrong words added as well as correct words missing). Sentences are "constructed" from the continuous stream of spoken words by setting a pause threshold between words. This and the erroneous recognition of words often leads to sentences that are grammatically incorrect. Hence, methods that rely on analyzing the structure of a sentence alone rarely provide satisfactory results. Erroneous word recognition has a detrimental effect on word statistics, such that relying on these statistics may lead to unintended or unexpected results. Adding to these difficulties is the need to process the text in real-time.

SUMMARY OF THE INVENTION

The foregoing and other problems are overcome by methods and apparatus in accordance with embodiments of this invention.

This invention grows at least partially out of a realization by the inventors that even when reading a poor transcript a person can usually describe the essence of the discourse. It is thus be desirable to provide an automatic system that is capable of capturing this "gist" of a transcript. Once captured, this "gist" constitutes metadata for the discourse, which can be stored with the discourse and can thus provide value in its own right. The processing of this metadata is thus an important aspect of this invention.

Using the automatically created metadata a method performs concept searches that produce the desired collateral information, and a novel ranking algorithm sorts the results of the concept searches. The ranking algorithm is not limited for use in only the disclosed applications and embodiments, and may also prove to be quite appropriate when performing traditional text searches.

Disclosed herein are methods and apparatus for locating, in real time or substantially real time, collateral information pertinent to a live television broadcast (or any other discourse or information stream that contains speech).

As employed herein a broadcast can be any signal that conveys information, such as a news broadcast or live or recorded coverage of a meeting or an assembly. The signal can be sent through any suitable medium, including the airwaves, through a coaxial cable and/or through an optical fiber. The signal can be sent as packets through a data a communications network, such as the Internet, or as a normal or a high definition television signal. In the presently preferred embodiment the signal includes an audio component, preferably conveying speech (e.g., a news broadcast). However, and as will be made apparent below, it is not required that there be an audio component, as a closed captioning signal can be used, as can text appearing as part of the video signal, as well as sub-titles appearing in a foreign language program. Certain features appearing in one or more video frames can also be used as recognizable entities, such as a number of human faces appearing in a video frame, and possible a recognition of the person whose face appears.

In the exemplary network broadcast embodiment the inventive technique begins with a text transcript of the broadcast generated by an automatic speech recognition system. Given the fact that speaker independent speech recognition technology, even if tailored for a specific broadcast scenario, generally produces transcripts with relatively low accuracy, algorithms are provided for determining the essence of the broadcast from the transcripts. Specifically, the inventive technique extracts named entities, topics, and sentence types from the transcript and uses the extracted information to automatically generate both structured and unstructured search queries. An aspect of these teachings is a distance-ranking algorithm that is used to select relevant information from the search results. The entire process may be performed on-line and in real time or substantially real time, and selected query results (i.e., the collateral information) can be added to, inserted within or otherwise included with (referred to herein generally as multiplexed with) the broadcast stream.

The teachings of this invention address the foregoing problems by providing a Watson Automatic Stream Analysis for Broadcast Information system (or WASABI), which takes speech audio as input, converts the audio stream into text using a speech recognition system, applies a variety of analyzers to the text stream to identify information elements, automatically generates queries from these information elements, and extracts data from the search results that is relevant to a current program. The resultant data may be inserted or multiplexed into a broadcast signal and transmitted along with the original audio/video program. The system is fully automatic and operates on-line, allowing broadcasters to add relevant collateral information to live programming in real time.

Given the goal of finding collateral information for a live broadcast in real time, the various component parts of the most preferred embodiment of the system of this invention operate in real time or substantially real time.

The teachings of this invention provide a method, a system and a computer executable program stored on a computer-readable media for providing collateral information for inclusion with an information stream. The method includes steps of (a) examining the information stream to recognize a presence of events that occur in the information stream; (b) automatically generating database queries from recognized events; and (c) analyzing database query results so as to rank and select database query results to be inserted into the information stream as collateral information.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figures 1, 1A, 1B:
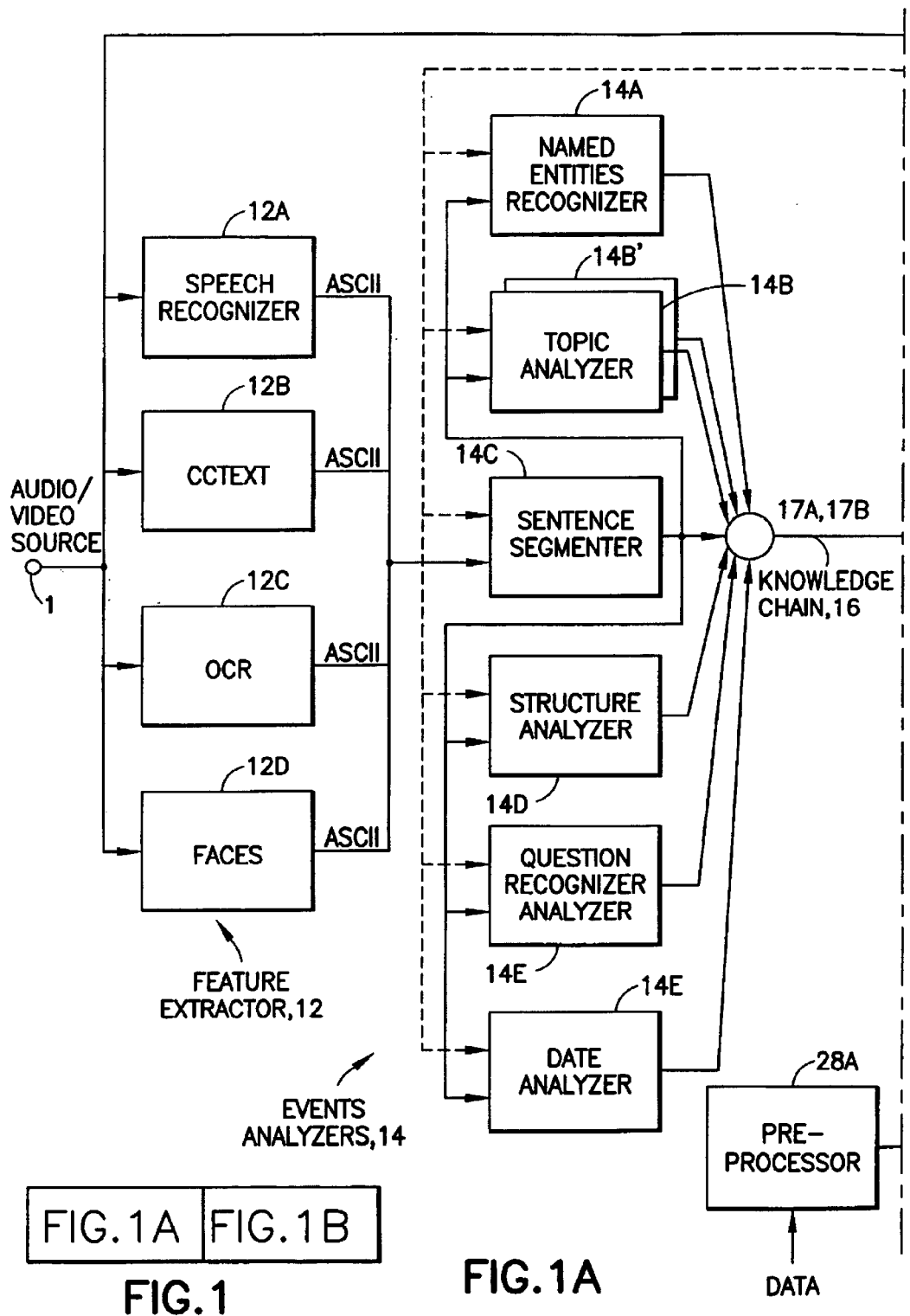
FIG. 1 is an overall block diagram of an automatic information stream analysis system, adapted for use with a video stream, that is constructed and operated in accordance with these teachings.
Figure 1B:
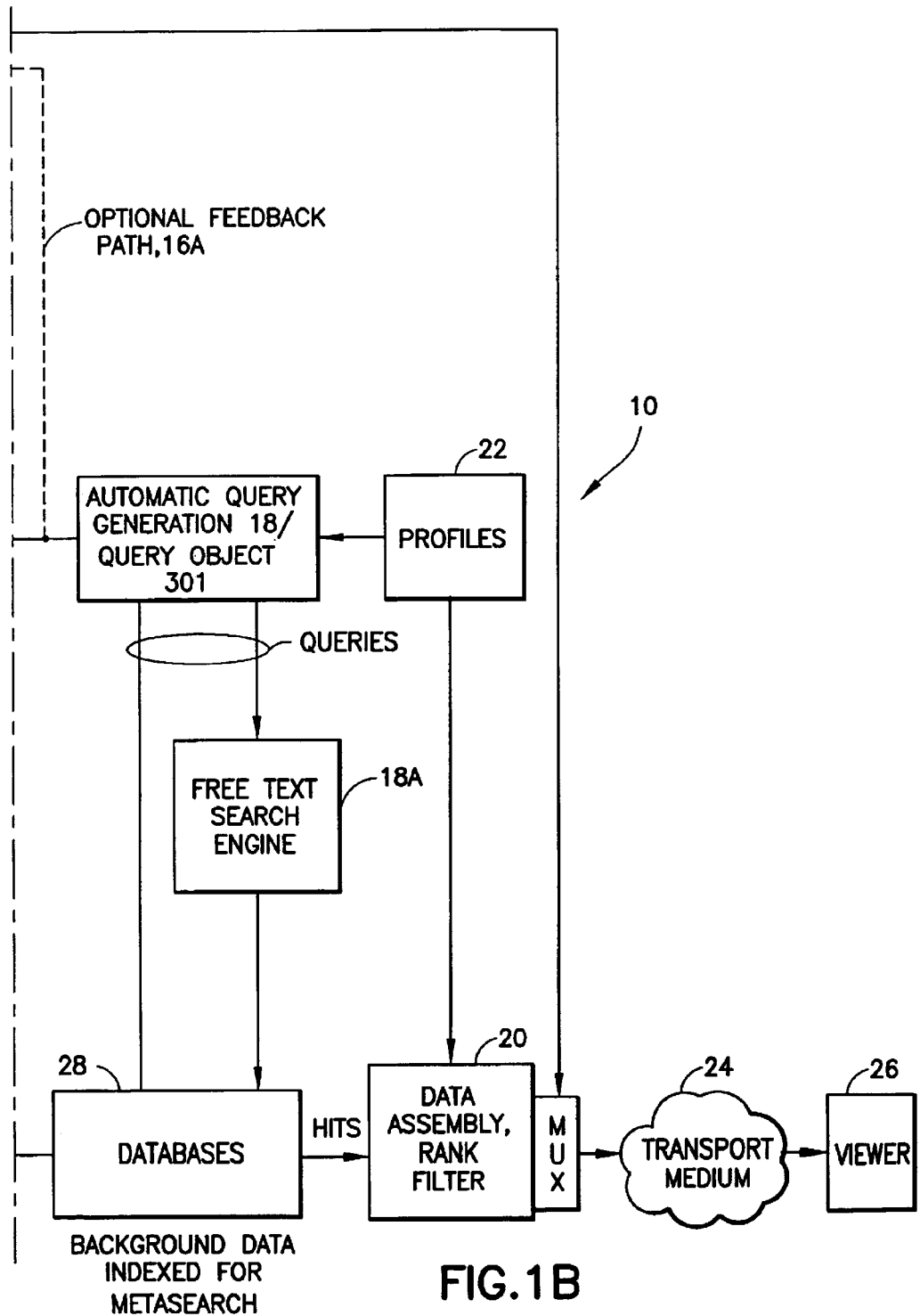

FIG. 1 is a block diagram depicting the overall architecture of the WASABI system 10. To facilitate development and operation of real time components, the components are preferably isolated from one another by a modular architecture with clearly defined interfaces. This approach has a further benefit that over time additional modules can be developed and integrated seamlessly into the system 10.

A real time feature extractor 12 receives as an input a live television audio/visual broadcast (information stream) from an audio/visual source 1. Note should be made of the fact that the audio/visual source 1 may, in certain embodiments, include one or more video cameras and microphones that are used to capture, in real-time, some proceedings, such as a meeting. The information stream is split such that it is also provided to an output multiplexer (data rank, assembly and filter module 20) so that it can be subsequently combined with the collateral information generated in accordance with the teachings of this invention. Modules 12A–12D of the feature extractor 12 determine a particular feature in real time from the input video/audio signal. In particular, a speech recognition module 12A transcribes the audio signal into English and a CCText module 12B extracts closed caption text from the video stream. An (optional) OCR (Optical Character Recognition) module 12C deciphers text overlaid on a frame, while an optional Faces module 12D determines the number of human faces appearing in a frame, and may identify at least some of the faces present in a video frame.

It should be realized that these four modules 12A–12D are exemplary, and not limiting, as other types of modules may be employed as well, such as a motion detection module.

More specifically, the speech recognition module 12A, which may be referred to simply as the speech module, takes an audio signal or file as input and produces a speech transcript (ASCII TEXT). The CCText module 12B extracts the closed caption text from the video and produces a transcript (ASCII TEXT). Optional other modules may also be employed, such as the OCR module 12C that takes the video as input and determines any text which may be present. This text may be overlayed, such as names or part of the video itself, such as the name of an object. The text recognized by the OCR module 12C may provide additional information relating to the currently displayed video, such as "recorded earlier at the White House", or it may identify a person who is speaking. The face module 12D takes the video as input and determines the number of faces and possibly the identities of the persons themselves. The outputs of the OCR module 12C and the faces module 12D may also be ASCII TEXT.

Such real time feature extractor modules 12A–12D are known in the art, and the specifics of their operation are not germane to an understanding of this invention. The usage of these modules, more specifically the usage of their output products is, however, of particular interest to these teachings.

The output of the real time feature extractor 12 is provided to an events analyzer 14, which includes a named entities module 14A and a topic detection module 14B. The algorithms executed by the named entities module 14A are, in the preferred embodiment, adaptation of known algorithms so as to work in real time. The topic detection module 14B is a system that is currently available from the assignee of this patent application.

Figure 2:
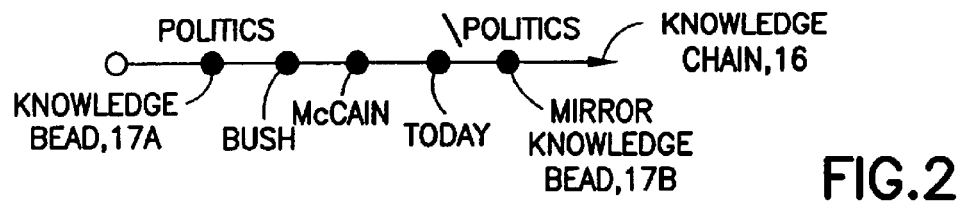
FIG. 2 depicts an output of an events analyzer of FIG. 1, referred to herein a KnowledgeChain.

The output of the events analyzer 14 is referred to he rein as a knowledge chain 16, which is shown in FIG. 2 and described in further detail below.

The knowledge chain 16 serves as an input to an automatic query generation module 18, the operation of which is of particular interest to the teachings of this invention, as will be made more apparent below, in conjunction with a data assembly, rank and filter module 20. Viewing preferences and interests, referred to as a profiles module 22, provides inputs to both the automatic query generation module 18 and to the data assembly, rank and filter module 20. A database 28, referred to as well as background data indexed for metasearch, is coupled to the automatic query generation module 18. The output of the data assembly, rank and filter module 20 is broadcast to a transport medium 24, such as the airwaves or a cable distribution system, and received by a suitable receiver 26, such as a television associated with a viewer.

Note should be made that the knowledge chain 16 can optionally be feed-back on path 16A as an input to one, some or all of the event analyzers 14.

Describing now these various components in greater detail, the feature extractor 12 produces ASCII text, both in the form of transcribed text, from speech module 12A, and closed caption text (CCText) from module 12B, if closed captioning is available. The text is time stamped and may be stored in conjunction with the source video signal. The other (optional) feature extractors (e.g., OCR, faces, motion, etc.) can also produce ASCII text outputs.

A simplest events analyzer 14 is a SentenceSegmenter 14C which takes the raw transcript, determines sentence boundaries and reformats the character string for display, as well as providing input for the other events analyzer modules 14, as described below.

The NamedEntitiesRecognizer 14A identifies named entities such as the names of people, places, organizations and companies, as well as various types of terms such as, but not limited to, financial terms, legal terms, and educational terms.

The TopicAnalyzer (Topic Detection) 14B determines which topic from a taxonomy of topics is being discussed (e.g., politics, weather, financial, etc.). Note that there may be one TopicAnalyzer 14B or a plurality of TopicAnalyzers, shown generally as 14B', each operating in parallel on an associated taxonomy.

Each analyzer 14A and 14B of the event analyzer module or subsystem 14, which represents an important aspect of this invention, performs an assigned task based on the input ASCII text, preferably but not necessarily after the ASCII text has been processed by the sentence segmenter 14C. The output of one analyzer (an event) can be the input to another analyzer. The output of an analyzer is again an ASCII string, which is time stamped (start and end time).

The Structure Analyzer 14D looks for specific types of sentences, including questions, demands and requests, and returns the sentence and its type (e.g., a question).

A Calendar or Date Analyzer 14F determines the time and date if it is mentioned in the text, and translates it into a standard format.

The output events from the analyzers 14 are stored, in a presently preferred embodiment, on a linked list data structure, referred to herein as the knowledge chain 16, an example of which can be found in FIG. 2. Briefly, all events are assembled on a timeline, with a start-event token and an end-event token. The precedence of events that start at the same time is immaterial. The events themselves can then be stored in a database, or a program can create an XML document based on the events for any time segment desired.

What constitutes an event depends on the events analyzer 14. For example, an event for the DateAnalyzer 14F constitutes the recognition of a date (or a time) in the ASCII text input, an event for the NamedEntitiesAnalyzer 14A constitutes a recognition of, for example, a person's name in the ASCII text input, while an event for the TopicAnalyzer 14B constitutes a recognition of a topic that corresponds to a predetermined topics taxonomy, for example, a politics topic, or a weather topic, in the ASCII text input. If events analyzers are provided that do not operate on text, then the occurrence of an event corresponds to the detection of some entity of interest in the input data (e.g., a specific color or sequence of colors in an input video image frame).

Once the knowledge chain 16 has been created, the net step is to find the collateral information that is desired to broadcast with the program. This is done by automatically generating queries based on the events recorded in the knowledge chain 16. The profiles 22 (either personal or application specific) may be used to guide the query generation module 18. The results from these queries are then assembled, ranked and sent to a multiplexer, implemented as the data assembly, rank and filter module 20, which inserts the results into the broadcast stream.

In a preferred, but not limiting, embodiment of this invention the speech transcript module 12A is implemented using an IBM ViaVoice (tm) product (IBM ViaVoice Millennium Pro. 2000) to transcribe the audio signal into ASCII text. The acoustic model is speaker independent and compensates for the background noise inherent in a broadcast news program. The acoustic model is combined with the standard business language model. The accuracy varies with speaker and recording conditions, but the transcribed text conveys the general gist of the broadcast.

It is straightforward to add words or phrases into the vocabulary of the speech module 12A, and therefore advisable to add current names or phrases into the system 10. Examples of words which can be added include name of politicians (both domestic and international) or phenomena (e.g., La Nina), which a standard business language vocabulary may not contain. If, for instance, the name McCain was not added, the system would pick a name that sounds similar to this politician's name. However, the gist of a reported story would change if a crucial name was not recognized. The vocabulary can be built up with time.

Other embodiments of the speech recognition module 12A may employ speaker and gender identification and the filtering of music to further improve the recognition accuracy.

Turning now to the CCText module 12B, the system 10 may use one of several available products that are capable of extracting closed caption text from a video signal. Again, each sentence becomes an event that is inserted into the Knowledge Chain 16. Clearly, the accuracy is quite high in this case and one may use only the ASCII output of the CCText module 12B for subsequent analysis. However, CCText may not be available in all broadcast programs and, furthermore, CCText does not contain any capitalization, which is quite useful for some analyzers. Moreover, the speech recognition module 12A may provide other information (such as speaker identification), that is, knowledge that cannot be deduced from CCText alone. As such, it is preferred to supplement the output of the CCText module 12B with at least the output of the speech recognition module 12A.

Turning now to the event analyzers module 14, several analyzers preferably adhere to the same interface and produce their respective output events in real-time. One basic event analyzer is the SentenceSegmenter(SS) 14C, which takes the raw ASCII transcript and outputs formatted sentences therefrom. In the preferred embodiment, sentence boundaries are deduced based on the length of the pause between words. Formatting includes adding appropriate capitalization and punctuation. Each recognized sentence is inserted into the Knowledge Chain 16. Speaker identification and gender identification may be employed to improve the accuracy of sentence boundary recognition. Techniques to improve grammatical correctness may also be used. In general, the more accurate and grammatically correct he sentences are, the better other downstream analyzers perform.

The output of the SentenceSegmenter 14C is input to the other analyzers, including the NamedEntitiesRecognizer 14A and the TopicRecognizer 14B. Each of these analyzers adds its output to the KnowledgeChain 16, which is described in further detail below.

An important analyzer is the NamedEntitiesRecognizer, 14A, which discovers named entities such as names of people, places, organizations, and companies, and other specific terms belonging to a particular subject, such as financial, banking, or educational terms. The algorithms used may be those provided or derived from the algorithms used in the above-mentioned Intelligent Miner for Text (see U.S. Pat. No. 5,832,480, incorporated by reference herein in its entirety). In particular, the algorithms perform in real-time. To identify a named entity, the capitalized words are looked up in dictionaries that list proper names, places, organizations, etc. If a word is a first name, and the subsequent word is capitalized, the analyzer puts them together to form a complete name. The analyzer continues to examine subsequent capitalized words to form the longest possible name. There are additional algorithms to recognize middle initials and titles. No disambiguation is done, as in general there is not enough information at this point to accurately do this (e.g., Tijuana can be a place or a person).

If a capitalized word is found in a dictionary with a specific type declaration (place or financial term, for example) it is classified as such. Capitalized words for which there is no type declaration are placed into a miscellaneous category, as it is believed that capitalized words convey in general more information than verbs or adjectives. There are various algorithms for each type of term. For example, if the name of a town or city is discovered, then the subsequent state word should be treated as a clarification of where the city is, and not as an event in its own right.

The TopicAnalyzer 14B determines which topic is being discussed, and assumes that a taxonomy is specified beforehand. In this case it is preferred to use the KitKat rule-based system developed by IBM (IBM Mail Analyzer, v. 6.2. 1999), which may be trained with a set of documents and has a user interface to specify rules manually. Clearly, any given sentence or set of sentences could describe more than one topic. A confidence value is associated with each recognized topic, which describes how sure the system is that a particular topic applies. Here the taxonomy is preferably adapted from the Dow Jones (tm) set of publications that are augmented to fit the broadcast news scenario. The advantage of using this taxonomy is that any background data drawn from Dow Jones sources is already classified according to the taxonomy, which aids in producing and processing results from automatically generated queries. Here the output of the SentenceSegmenter 14C is used as input for the TopicRecognizer 14B. However, it is also possible to string several sentences together to form an input, although varying the size of the input to the TopicRecognizer 14B is expected to change the performance of this analyzer. In particular, one may use "paragraphs" (i.e., several sequential sentences) or overlapping paragraphs. However, the extreme run-time requirement of this application places certain restrictions the length of the input.

The StructureAnalyzer 14D preferably employs at least some concepts developed in a Question Answering system by Prager et al. (see, John Prager, Eric Brown, Anni Coden and D. Radev "Question-Answering by Predictive Annotation", *Proceedings of SIGIR* 2000 (Jul. 24–28, 2000), and J. M. Prager, E. W. Brown, A. R. Coden and D. Radev. "The Use of Predictive Annotation for Question-Answering in TREC8", *Proceedings of TREC*8, Gaithersburg, Md., 2000). Also of interest is U.S. patent application Ser. No. 09/495,645, filed Feb. 1, 2000, incorporated by reference herein in its entirety.

The basic approach relies on the fact is that certain sentence structures suggest an action that is different from performing a search based solely on the words in the sentence. For example, the question, "Who discovered Penicillin?" suggests that the person is interested in a name and not in a sentence containing the words of the question (which could be paraphrased in the text). Similarly, the request, "Please show me the full text of the State of the Union Address" requires the system to find a piece of text.

The StructureAnalyzer 14D identifies and labels the structure of each sentence. For instance, the QuestionRecognizer Analyzer 14E is a type of StructureAnalyzer 14D. In its simplest form it checks whether a sentence starts with a "question-word" such as who, when and how to name a few examples. Having identified a sentence as a question, it replaces parts of the sentence with Question-Answering Tokens. The transformed sentence becomes now a query against a corpus that is indexed taking the Question-Answering Tokens into account. Such a search returns answers in a "hit list", which becomes the desired collateral information.

For example: The announcer says: Where did George W. Bush and John McCain meet today? It was at the place where they had their last controversy. Based on the first sentence, the system creates a query "$place George W. Bush John McCain meet today" and returns with "Manchester, New Hampshire".

Another analyzer, the DateAnalyzer 14F, further assists in the previous example. The DateAnalyzer 14F identifies absolute dates as well as indirect date references (such as "today") and calculates an absolute date in a standard format. It has been found to be important to establish a reference date, which is a relatively simple task in a live broadcast setting or in analyzing meetings. Dates can also be important for finding appropriate collateral information. Referring to the previous example, George W. Bush and John McCain had several meetings, not just the meeting "today". The DateAnalyzer 14F is preferably rule-based, using the same system as the TopicAnalyzer 14B.

This rule-based system may also be applied to find other types of structures, such as requests "Please show the agenda" or to perform a task. "Next slide please". The discovered events are added to the KnowledgeChain 16.

In the previous discussion the operation of several different types of analyzers 14A–14F was described. Each one of these analyzers 14 creates as output an event, e.g., a recognized sentence, topic, name, date, etc., to the KnowledgeChain 16. The use of the KnowledgeChain 16, which is made up made up of individual KnowledgeBeads 17A, is depicted in FIG. 2.

In accordance with an aspect of these teachings the system 10 creates an Object, a KnowledgeBead 17A, which contains the following information: type of event, start time, end time, description of event, an assigned unique identification (id) and an optional object. The description of an event could be an object in itself with its own access methods, a simple ASCII text, or in systems that discover multimedia events; it could be an image or a video clip. Additional pertinent information can also be included, such as a confidence value of a discovered topic. Each KnowledgeBead 17A has a corresponding MirrorKnowledgeBead 17B that acts as an end tag for the event in the KnowledgeChain 16. In one preferred embodiment the MirrorKnowledgeBead 17B contains the same information as the corresponding KnowledgeBead 17A, with two exceptions: (a) the end time is substituted for the start time and (2) the id, which is a positive number, is the equivalent negative number.

Each KnowledgeBead 17A is inserted into the KnowledgeChain 16 at its start time. The MirrorKnowledgeBead 17B is inserted at the end time. The precedence of KnowledgeBeads 17A with same start times is immaterial, as is the precedence of the MirrorKnowledgeBeads 17B with same end times. At any given point in time, examining the KnowledgeChain 16 gives a description of the broadcast. The KnowledgeChain 16 has a set of methods associated with it to facilitate its manipulation. A representative list of such methods is as follows:

Insert a KnowledgeBead 17 at time t

Delete a KnowledgeBead 17 at time t

Find the MirrorKnowledgeBead 17B to a KnowledgeBead 17

Find all of the KnowledgeBeads 17A between a particular KnowledgeBead 17A and a MirrorKnowledgeBead 17B that corresponds to the particular KnowledgeBead 17A Find all the KnowledgeBeads 17A starting at time t Find all the KnowledgeBeads 17A ending at time t Furthermore, there are access methods provided for the KnowledgeBeads 17A themselves:

Get start time

Get end time

Get type

Get description

The description may be a structure appropriate for the type of KnowledgeBead 17A.

FIG. 2 depicts an exemplary KnowledgeChain 16. Note that the KnowledgeBeads 17A are not necessarily inserted in a time-sequential manner. However, the KnowledgeChain 16 provides a time-sorted synopsis of the broadcast.

One preferred embodiment of a Knowledge Chain 16 is a doubly linked list, a type of data structure that is quite extensively described in the literature. The ordering of this doubly linked list is according to time, with a forward direction in increasing time direction.

When constructing the KnowledgeChain 16 the system 10 may accumulate some number of sentences before recognizing a topic or an event that is appropriate to add as a KnowledgeBead 17A. In this case, if some maximum number of accumulated sentences is reached (e.g., 10), then the first m accumulated sentences (e.g., 5) may be flushed from the queue.

If the situation occurs that a MirrorKnowledgeBead 17B is followed by the same type or category of KnowledgeBead 17A (e.g., Politics 17A . . . \Politics 17B followed by Politics 17A . . . \Politics 17B), then in one embodiment the two intermediate boundary KnowledgeBeads 17B, 17A can be deleted, thereby merging the two shorter Politics KnowledgeChain segments into one longer segment.

It is also within the scope of these teachings to nest KnowledgeBeads of different types, instead of providing an essentially linear sequence as in FIG. 2. For example, and depending on the Taxonomy used, assume that the Topic Analyzer 14B is capable of distinguishing the Politics Topic as National Politics and State Politics. In this case, and assuming a discourse at the national level that involves also local (state) issues, it may be possible to generate the KnowledgeChain 16 with KnowledgeBeads 17 as: National Politics 17A . . . \State Politics 17A . . . \State Politics 17B . . . \National Politics 17B. The use of the multiple TopicAnalyzers 14B, 14B' operating in parallel is particularly useful in this case. Note as well that the KnowledgeBeads 17 may be interwoven, for example: National Politics 17A . . . State Politics 17A . . . Municipal Politics 17A . . . \State Politics 17B . . . \National Politics 17B . . . \Municipal Politics 17B.

Once the events extracted by the analyzers 14 are assembled on a time line in the KnowledgeChain 16, the next step of the method is to automatically generate queries with module or subsystem 18 of FIG. 1 in order to locate collateral information.

The first issue to be addressed is when to issue a query. A relatively simple approach poses a query whenever an event occurs. However, it is believed that sending queries at the discovery of every event would both create a performance problem and generate a significant amount of irrelevant information. For example, a query based solely on a name would typically return too many hits to send over the broadcast signal, and moreover, no meaningful ranking could be applied to the hits to determine the most relevant hits.

It is preferred instead to pose queries whenever a topic is detected by the Topic Analyzer 14B. At this point all of the KnowledgeBeads 17A between the start of the topic and the end of the topic are assembled into a QueryObject 301 (FIG. 3) that represents the basis for query formulation The KnowledgeBeads 17A which have the same start time as the KnowledgeBead 17A denoting the beginning of a Topic, and the MirrorKnowledgeBeads 17B having the same end time as the MirrorKnowledgeBead 17B denoting the end of a Topic are included in the QueryObject 301.

Once a QueryObject 301 has been created, the next step examine the identified sentence structure. If the structure is such that the query should be handled by a specific action subsystem, the query is sent to that subsystem for processing. For example, the query might request the invocation of a specific program. That is, a request to show a person's presentation for today's meeting may require the following steps:

Open the program capable of showing a presentation

Figure 3:
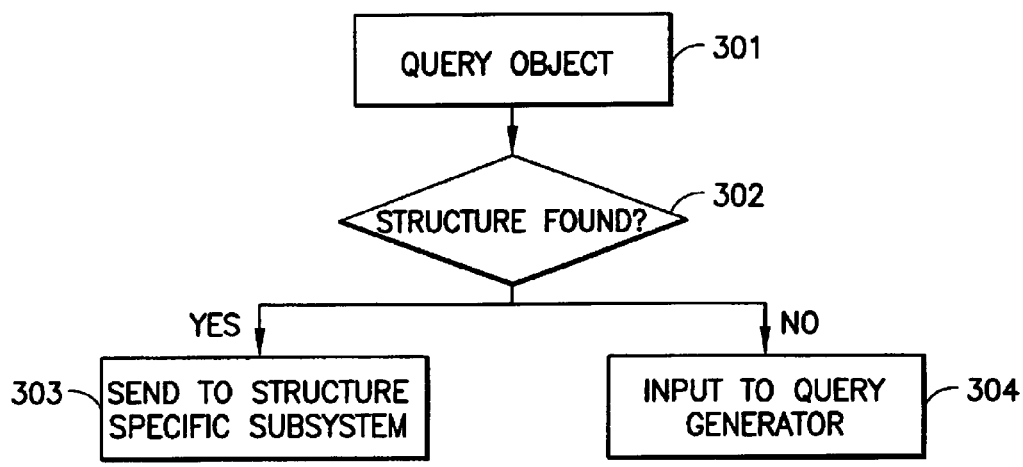
FIG. 3 depicts a flowchart showing the use of a QueryObject that forms an input to a StructureAnalyzer, and relates to the processing of KnowledgeBeads that comprise the KnowledgeChain of FIG. 2.

Find the KnowledgeBeads 17A specifying the name and date of the desired presentation Query the database 28 to find the actual presentation FIG. 3 depicts a flowchart of the foregoing process. The QueryObject just described is shown as 301 and forms an input to the StructureAnalyzer 14D, in this case using the optional KnowledgeChain 16 feedback path 16A shown in FIG. 1. Examples of the StructureAnalyzer 14D are modules which determine whether a piece of text denotes a question or a request, as was discussed above. If a particular structure is found in Step 302 it is sent to a structure specific subsystem (e.g., show next slide), as shown in 303, otherwise it forms the input to the Query Generator 18 at Step 304. Query Generators that operate in accordance with aspects of this invention are described below.

Figure 4:
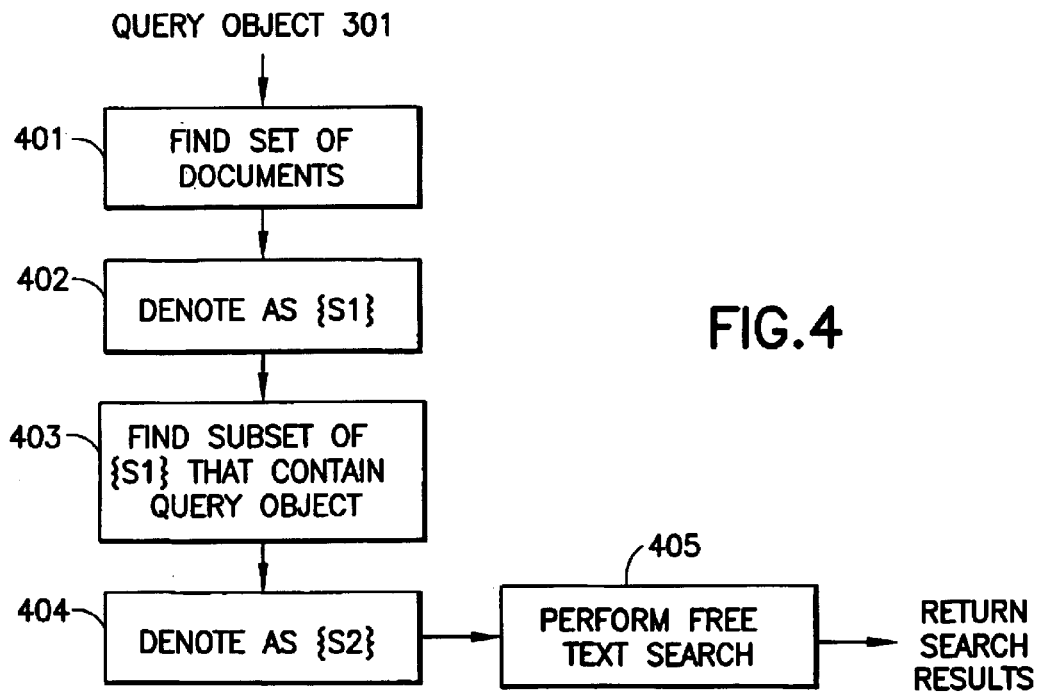
FIG. 4 depicts a method for operating a Query Generator component of the system shown in FIG. 1.

FIG. 4 depicts a method for operating the Query Generator 18. The QueryObject 301 is the input. Using its Topic, at Step 401 the set of documents in a text collection is found which cover this topic and the set is denoted as {S1} in Step 402. In Step 403 the subset of documents from {S1} is determined that contain the named entities as specified in the QueryObject 301. This set is denoted as {S2} at Step 404. Using the collection of words generated by the transcript, as specified in the QueryObject 301, a free-text search is performed against the set of documents {S2} at Step 405 and the results of this search are returned in the order they are returned from the free-text search engine 18A.

If the identified structure of the QueryObject 301 does not direct the query to a specific action subsystem, then processing can proceed in one of at least two ways. In the first approach, the query is processed with the following steps:

Identify the topic of the QueryObject 301

Search for named entities constrained by the topic

Perform a free-text search constrained by the topic

Figure 5:
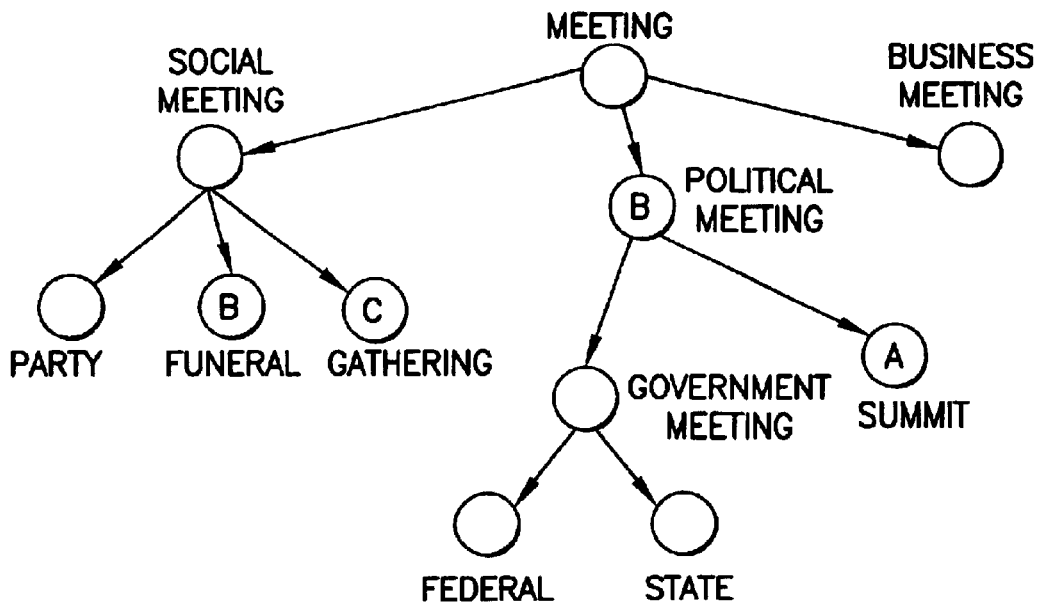
FIG. 5 shows an example of a topic taxonomy.

Assuming that the background data stored in database 28 has been categorized using the same taxonomy as that used by the TopicAnalyzer 14B, for any given data item, the assigned topic is stored as metadata in the database 28. Hence the first step is a database query to identify items with matching topics, and to thus constrain the scope of the following two searches. If the initial topic search returns an empty set, the query is repeated with the parent node in the topic taxonomy. FIG. 5 shows an example of a topic taxonomy, wherein the root node Meeting is the parent node for child nodes Social Meeting, Political Meeting and Business Meeting, where the child node Political Meeting is the parent node for nodes Government Meeting and Summit, etc.

A second query (named entity search) is applied to data items found by the first query. Named entities can be augmented with variants of the name and then used to search databases 28 that are specific to the type of named entity. The results from these searches are expected to be high quality data items that can immediately be added to the collateral information set.

The third query is sent to the free text search engine 18A, again constrained to the set of items found in the first step. The input to the free text search engine 18A is the ASCII TEXT transcript, with stop words removed and lemmatization applied. The free text search engine 18A returns a ranked list of items, and some number of top ranked items are selected as collateral information for the broadcast, as is described in detail below. Note that although this process is described as a sequence of three steps, for improved performance the entire procedure may be accomplished with a single "multisearch" query, as described by A. Coden, J. Breretton and Michael Schwartz, "System and Method for Performing Complex Heterogeneous DataBase Queries using a Single Expression", U.S. patent application Ser. No. 09/289,020, filed Apr. 9, 1999, incorporated by reference herein in its entirety.

The first approach is appealing because it is straightforward. However, it relies on the rank scores returned by the text search engine to select collateral information, potentially resulting in the inclusion of irrelevant data. The second approach to query formulation addresses this problem with a more sophisticated data ranking and selection procedure. The second approach is explained by way of example.

Assume that a news broadcast mentions that Putin, Jaspin, and Clinton attended a summit meeting in Berlin. From the topic taxonomy (see FIG. 5) it is known that a summit meeting is a type of political meeting, which in turn is a type of meeting. In FIG. 5, each node is a topic, the taxonomy is hierarchical with more general topics at the root and more specific topics at the leaves, and the letters inside certain nodes indicate how topics have been assigned to three particular documents in the background data collection (in this example documents A, B, and C). In this example it is assumed that it may be interesting to determine what other meetings (perhaps within a particular time frame) these three world leaders also attended.

To find documents related to such meetings, the system 10 first executes a free text search using all of the terms in the QueryObject 301. The top n documents returned by the free text search are then scored by the system using the following formula:

$$S_i = R_i + E_i + P_i$$

where $S_i$ is the score of document i, $R_i$ is the rank of document i, where the top scoring document returned by the free text search engine 18A has rank 0, the next best-scoring document has rank 1, etc., $E_i$ is the number of named entities (NE) in the QueryObject 301 that do not appear in document i, and $P_i$ is a taxonomy path (TP) score of document i, as described in further detail below.

Figure 6:
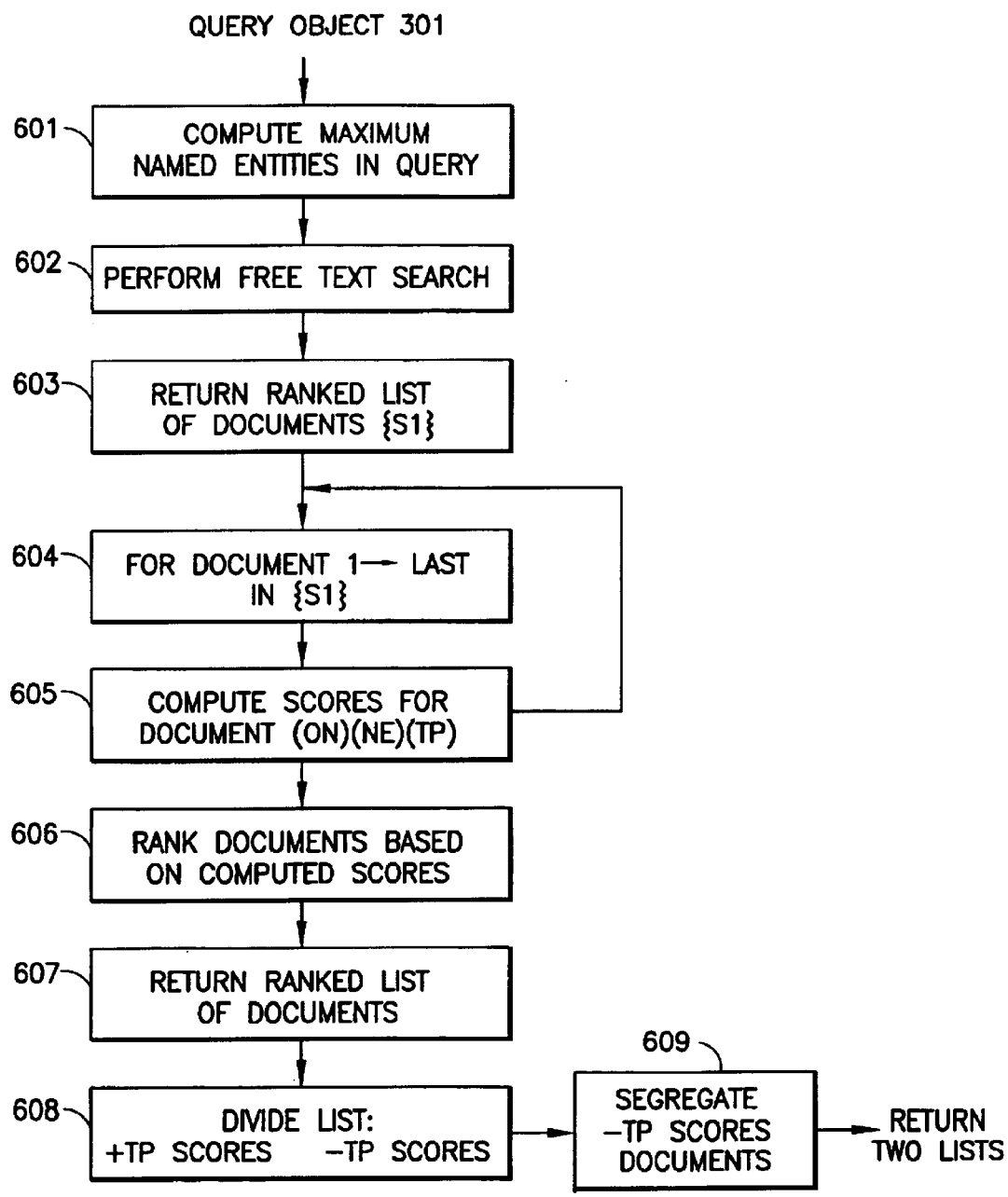
FIG. 6 is a logic flow diagram that illustrates a search result ranking methodology.

FIG. 6 is a logic flow diagram that formalizes the above approach. The QueryObject 301 is the input. First, at Step 601, MAX-NE, the number of distinct named entities in the Query is computed. Then at Step 602 a free text search, using engine 18A, is performed against the corpus which returns a ranked list {S1} in Step 603, where a free-text rank (ft_rank) is associated with each document. In Step 604 the method cycles through each document in {S1} and computes three scores for each document in Step 605: These scores are the order number (ON) which is the sequence number (SN) in the ordered set {S1}, with 0 being assigned to the top ranked document. The sequence numbers are ascending integers. The Named Entity (NE) is the number of Named Entities that do not appear in the document. The Taxonomy Path (TP) score is the shortest number of edges between the topic of the document and the topic of the query. Note, that if the document has several topics assigned to it, the topic taxonomy path score for all the topics is computed and the smallest number is selected as the Taxonomy path score. Furthermore, if the document Topic is not a child Topic of the Query Object 301 topic, the Taxonomy path score is negated. In Step 606 the Rank of each document is computed depending on the three scores. The system 10 then returns a ranked list of documents in Step 607, and in Step 608 the ranked list is divided into two ranked lists, one with positive Taxonomy path scores, and one with negative Taxonomy path scores. In Step 609 all of the documents with negative Taxonomy path score are placed in a separate list while maintaining the original sequence. However a new order number is assigned and the Taxonomy path score is made positive. The system 10 returns two lists, one which contain documents which have topics which are the same as the query or topics which are children and then the rest of the documents.

The Taxonomy Path score of a document is calculate by locating the document's topic in the taxonomy tree (FIG. 5) and traversing the shortest path (defined by the number of edges) from that topic to the topic assigned to the QueryObject 301. In FIG. 5, the QueryObject topic is "Summit". The path score for document A (assigned to topic "Summit") is 0, the path score for document B (assigned to topics "Political Meeting" and "Funeral") is −1, and the path score for document C (assigned to topic "Gathering") is −4. Note that although document B is assigned to two topics in the taxonomy, the path score is calculated using the topic closest to the QueryObject 301 topic. This presently preferred document scoring formula produces scores such that better documents have lower scores, and factors in the scores returned by the free text search engine 18A, exploiting the fact that named entities tend to be more precise query terms, and by using the query topic and the topics assigned to the documents to further refine the search. If the formula assigns the same score to two or more documents, the documents may be further ordered such as by considering the frequency of occurrence of the named entities in the documents.

Figure 9:
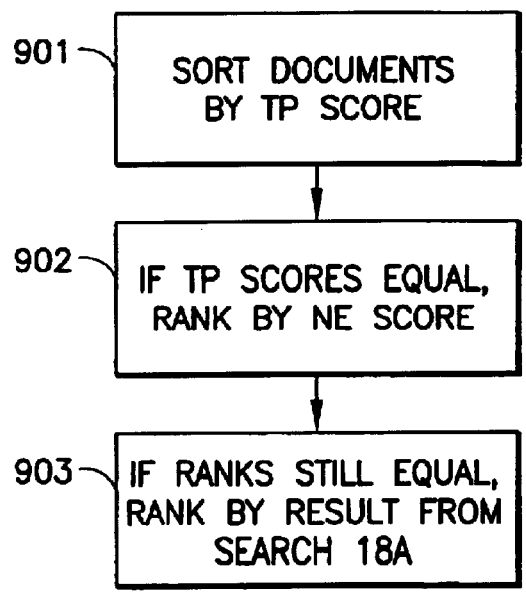
FIGS. 7, 8 and 9 are logic flow diagrams showing the operation of algorithms applied during the operation of the method shown in FIG. 6.
Figure 7:
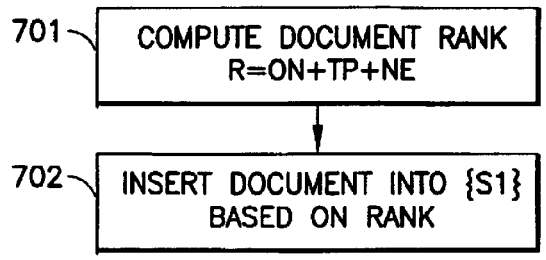
Figure 8:
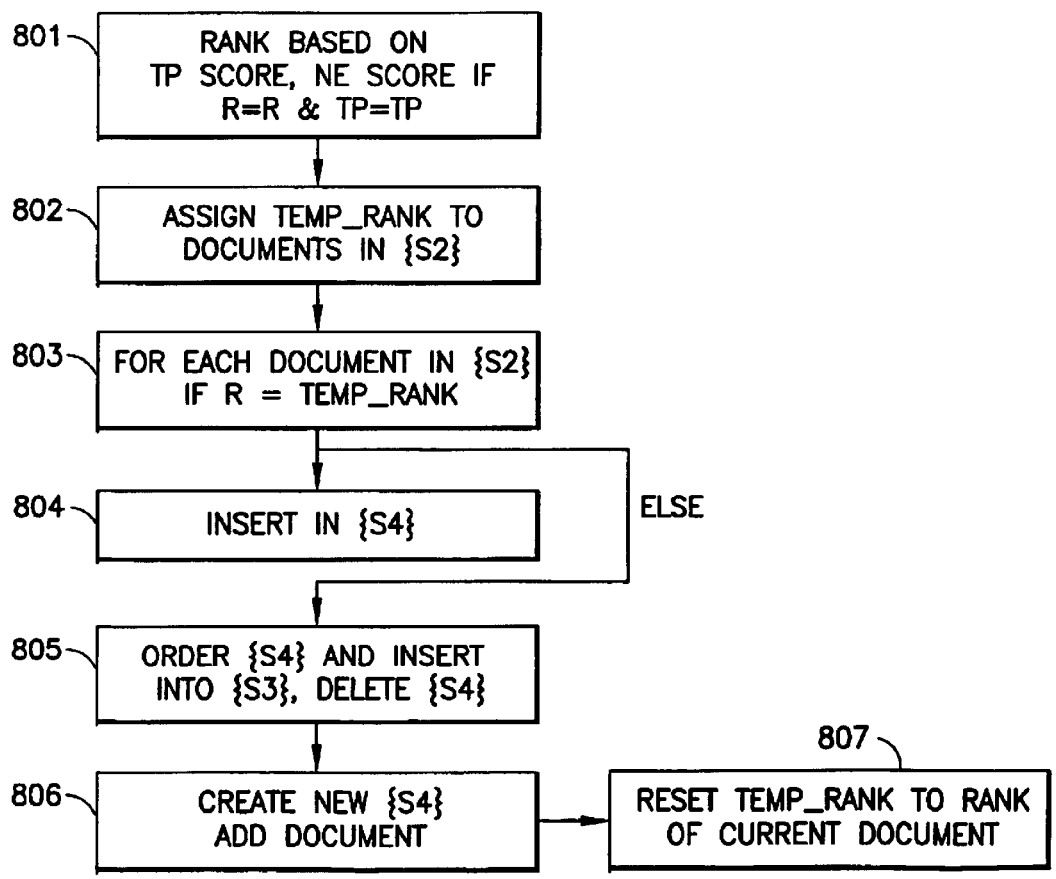

FIGS. 7, 8 and 9 show the algorithms applied to each of he two ranked lists, wherein the system 10 returns two ranked lists in FIG. 6. In FIG. 7, which illustrates the operation of Step 606, for each document in the set, the rank of the document is computed in Step 701. As was explained previously, the rank R is computed as the arithmetic sum of the sequence number (SN), the Taxonomy Path (TP) score and the Named Entity (NE) score. Clearly two documents can have the same rank, and their ordering in this case is described in more detail in FIG. 8. Then in Step 702 the document is inserted into a set {S} according to its rank.

FIG. 8 shows in detail how the insertion of documents into a rank ordered list is accomplished in Step 702. Documents which have the same rank R are ranked in the following manner: At Step 801 these documents are first ranked in ascending Taxonomy Path (TP) score, where documents with equal Taxonomy Path scores and equal rank R are ordered according the Named Entities score (those Named Entities not found in the document. The third criteria is the rank number as returned by the free text search. In particular, the algorithm starts with a ranked ordered list {S2} of documents in Step 802 and assigns a variable TEMP_RANK the value 0. In Step 803 the method cycles through this set. For each document in {S2}, its rank R is examined. If R is the same as the current TEMP_RANK the document is inserted into a temporary list {S4} in Step 804. Otherwise the algorithm proceeds to Step 805. There the sublist {S4} is ordered (as described in FIG. 9) and inserted into {S3}. At Step 805 the list {S4} is deleted, and at Step 806 a new list {S4} is created by adding the document to it. In Step 807 TEMP_RANK is reset to the rank of the current document.

FIG. 9 illustrates how a list of equally ranked documents are re-ranked in Step 801. First they are sorted by Taxonomy Path distance in Step 901. Documents with equal Taxonomy Path distance are ordered by number of found Named Entities in Step 902 and documents which are still ranked the same are rankled according to the original rank as returned by the free text search engine 18A in Step 903. Clearly, documents may still have the same rank.

A discussion is now made of various aspects of background data preparation. The quality of the collateral data found by the system 10 depends directly on the databases 28 that are available to the system 10 for searching. In the preferred embodiment, but not by way of limitation, data obtained from Dow Jones(tm) is used, which includes sources such as the New York Times, Wall Street Journal, and Newswires. Other sources may include the World Wide Web and Lotus Notes databases. These sources were selected both for their appropriateness and their availability. However, what is more noteworthy is how the data is viewed and prepared for the search. It is important to remember that in the presently preferred embodiment the entire process, from transcription to analysis, query preparation, search and data assembly, is performed in real time or as close to real time as is possible. Currently, searches made against the World Wide Web are quite slow and are not appropriate for this application. Therefore, it is preferred to store all the searchable data on the local databases 28, with all of the associated metadata, and to create a single index for all the data. However, additional specialized indices may be available for subsystems such as the above-mentioned Question Answering subsystem (QuestionRecognizer Analyzer 14E).

The Dow Jones(tm) data contains embedded metatags drawn from their taxonomy. A data preprocessor 28A (see FIG. 1) parses the data and stores the metatags in the database 28 to be used for fast queries. For example, the data contains geographical information, which is ordered in relevance to the article. In the preferred embodiment all of this information is stored in the database system 28 that is based on DB2.

Assume that a relevant article for a broadcast segment is found in the database 28. Not only can the method show the article, but also the other areas affected. An example is trade and company information, which may span several countries. General concept queries about "what events happened in a certain country" can be easily answered and rank ordered by the rank ordering in the geographical data.

In the foregoing description mention has been made several times of choices an application of the system 10 can make, such as which analyzers 14 should be used. The presence of the SentenceSegmenter 14C is important in order to deal with the transcript, but the remainder of the analyzers, the dictionaries used, the rules governing the topics, and the subsystems processing structured requests are typically application specific. The system 10 is flexible and enables one to "mix and match" the various components. However, even for a given application, a user may have specific preferences, such as seeing (or not seeing) biographical or geographical information, and/or a type of source one is interested in, and/or a date range, etc. The rule-based system described herein may readily accommodate such preference through the use of the profiles 22 (FIG. 1). The profiles 22 are expressed in terms of rules, and may be incrementally added to the system 10 as desired. The profiles 22 may thus be considered to place user-specified or other constraints on the operation of the Automatic Query Generation subsystem 18, as well as on the search engine(s) that operate under its direction.

There are a number of performance questions related to the system 10 described herein, ranging from the speed and effectiveness of individual analyzers 14, to the overall usefulness of the system 10 measured by end-user satisfaction.

Evaluating the individual analyzers 14 is somewhat straightforward. Techniques from traditional information retrieval and natural language processing evaluation may be used, including standard precision and recall measures for named entity recognition and text search effectiveness.

An embodiment of the WASABI system 10 was constructed on a Windows(tm) platform with a Java(tm) Client front-end.

Figure 10:
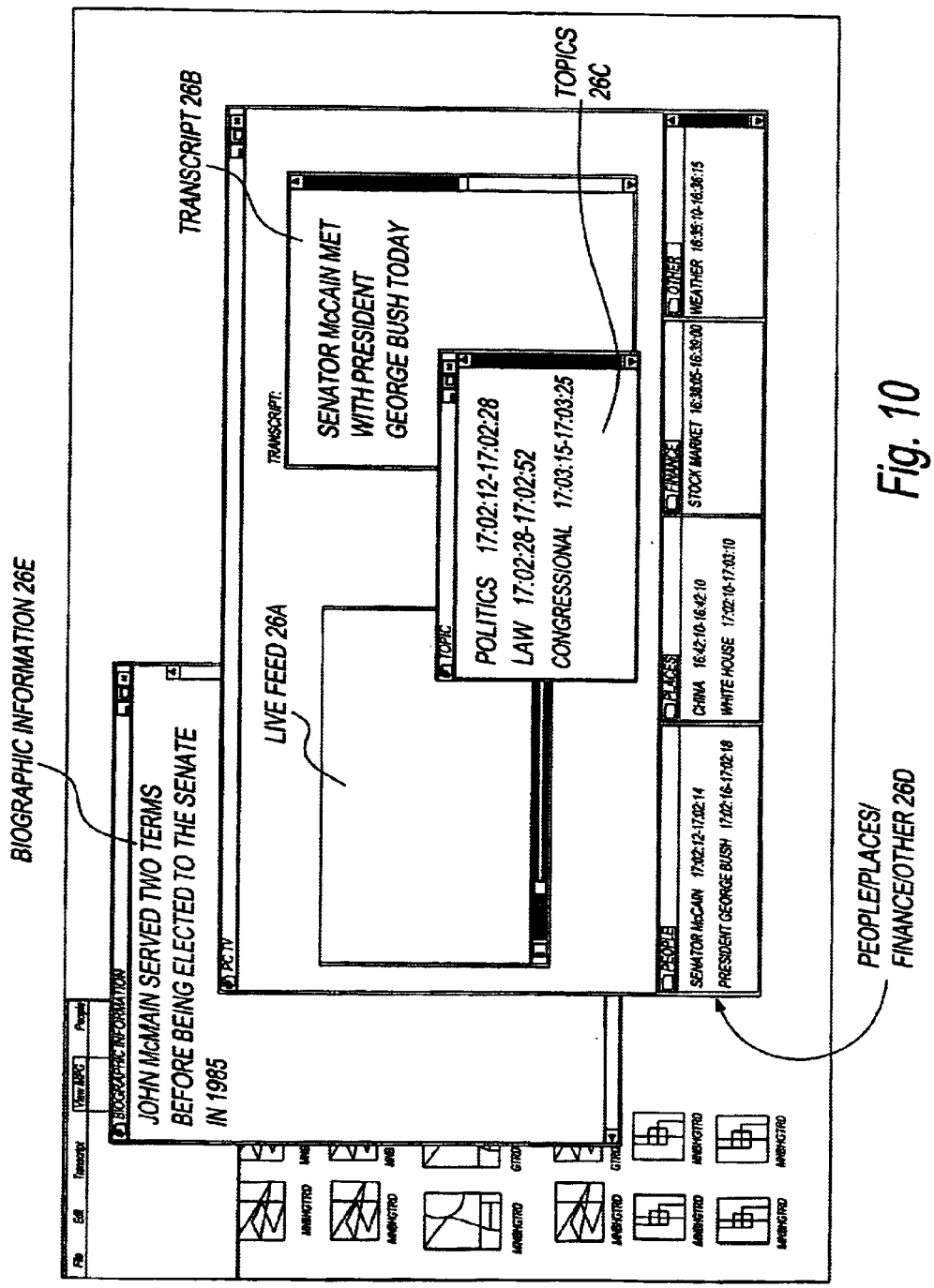
FIG. 10 is an exemplary screenshot of an audio/visual program stream that contains collateral information in accordance with the foregoing teachings.

FIG. 10 shows an exemplary screenshot of the output of the system 10. In FIG. 10 the monitor 26 display screen is partitioned into a live feed portion 26A, a Transcript portion 26B for showing, in this case, the text generated by the Speech Recognizer 12A from the audio portion of the live feed, a Topics portion 26C for showing the Topics in the speech transcript that are recognized by the Topic Analyzer(s) 14B, 14B', and a Recognized Events portion 26D for displaying various named entities as they are recognized by the NamedEntitiesRecognizer 14A (e.g., people, places, finance, etc.). The collateral information generated as a result of searches of the database(s) 28 is also displayed in various windows. In the illustrated example there is a window for displaying Biographic Information 26E related to various ones of the named entities, such as the birth date, place of birth and occupation corresponding to people's names recognized by the NamedEntitiesRecognizer 14A (for example, the name could be derived from an output of the Faces Feature extractor 12D or from the speech transcript 26B or from the CCText extractor 12B) Other collateral information could include geographic and/or demographic information. such as the location, population, date founded, per capita income, etc. of a city corresponding to an identified city name. It can be appreciated that the inclusion of the collateral information, as well as the other displayed information, adds great value to the viewing experience of the live feed.

The system 10 was exercised with world news by a national television network. During the system evaluation, the taped broadcast was digitized and transcribed manually. The tape was manually analyzed to determine the number and type of named entities present. There were 67 distinct named entities in a half hour broadcast (excluding commercial content). These were divided into four classes: people, places, financial terms, and miscellaneous other terms. Half of the named entities were persons and 23% were places. Roughly 20% of the named persons were reporters in the field or people interviewed in the field, typically names one cannot expect a speech recognition system to recognize. Furthermore, these names are generally not relevant to the type of searches the system performs, where the goal is to find more information about an event. As such, it was found that only 55 of the named entities mentioned were relevant for the system 10.

In the transcript generated by the speech module 12A a total of 34 relevant named entities were detected, a 62% recognition rate, which was found to be higher than the recognition rate for the entire document. The system 10 recognized 98% of the named entities in the transcript.

In spite of being a real-time system, the system 10 is capable of inferring that different references of a name may all point to the same person, for instance "George W. Bush", "Governor Bush" and "Gov. Bush". Timing information and topic shifts may be used to identify these equivalences. In a data application it is desirable to determine equivalent named entities and avoid sending out the same collateral information more than once over the limited bandwidth broadcast channel.

The addition of additional data, referred to above also as the collateral information, to broadcast television by the multiplexer 20 (FIG. 1) provides a new and improved television viewing experience. The system 10 addresses and solves the problem of automatically determining what data to send along with the audio/video program by analyzing spoken discourse and automatically finding collateral information. This process occurs in real-time by using the text transcript generated by an automatic speech recognition system 12A, supplemented if desired with other features extracted from the input signal. While traditional information retrieval methods are not always applicable due to the type of discourse and the grammatical mistakes in the transcript, an aspect of this invention provides algorithms that address these issues.

FIG. 1 is a block diagram showing an exemplary data processing or computer system 100 on which a preferred embodiment of the present invention may operate. This non-limiting example data processing system 100 uses an IBM PC computer (trademark of IBM Corp.) running an operating system such as the Microsoft Windows NT 4.0 operating system (trademark of Microsoft Corp.) and IBM Database 2 Single User Edition for Windows NT, version 2.1.2 or higher (trademark of IBM Corp.), or equivalent. The data processing system 100 includes a processor 102, which includes at least one central processing unit (CPU) 104 and memory 106. Additional memory, such as a hard disk file storage 108 and a removable media device 110 having removable media 112 may be connected to the processor 102. Additional memory 140 can be connected via a network and may contain one or more databases 150, including the database(s) 28. The removable media device 110 may read from and, usually, writes to the removable media 112. Examples of the removable media 112 include: a magnetic tape, a compact disk-read only (CD-ROM), write once (CD-R) or rewritable (DC_RW) memory, and any other well known readable and writable media. Memory 106, 108, 112 may have computer program code 101 recorded therein that implements portions of the present invention in the data processing system 100. Inputs may also be received from input devices that could include: a fax/modem 114 or network interface card 114A, which is connected to a telephone line 132 and/or a local area or wide area network 116, e.g. the Internet. The data processing system 100 also can include user interface hardware, such as a pointing device (e.g. a mouse) 120, a keyboard 122, an optical scanner 118 and a microphone 124 for allowing user input to the processor 102. The data processing system 100 may have output devices that could include: one or more visual display devices (e.g. a monochrome or color display monitor 126) and/or a monochrome or color display printer 128, for rendering visual information. For instance, a Graphical User Interface (GUI) can use monitor 126 to display, as in FIG. 10, a live feed portion of a broadcast or a meeting, as well as the collateral information (e.g., Topics, Biographies, etc.) derived in accordance with these teachings, as well as other information, such as the Transcipt output by the speech recognizer 12A, etc. In some alternative embodiments, the data processing system includes: an audio display device, such as a speaker 130, for rendering audio information. A telephone 132A may also be connected to the telephone line 132.

Figure 11:
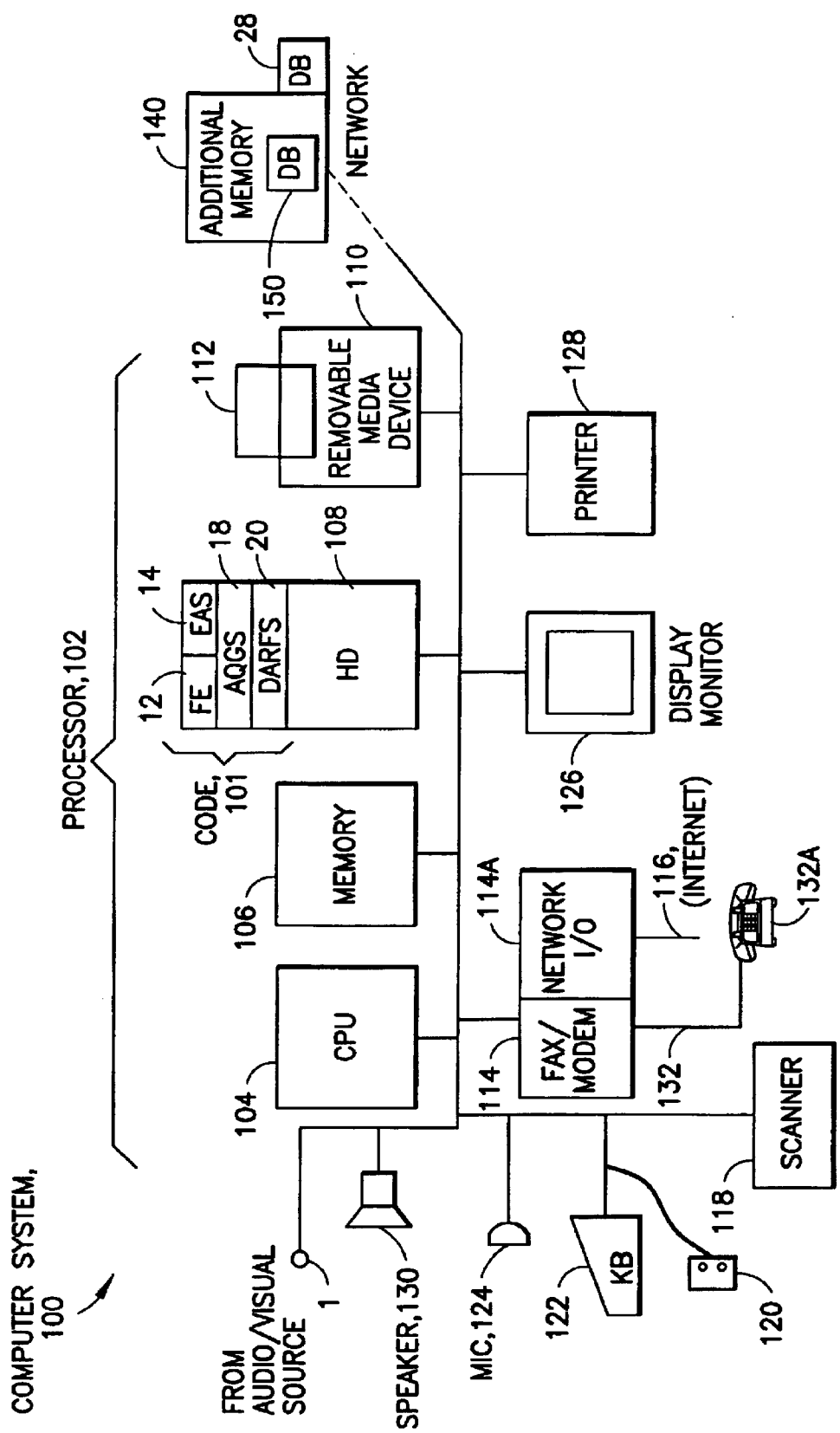
FIG. 11 is a block diagram of a computer system that is suitable for practicing this invention.

It is expected that those skilled in the art will be familiar with many equivalent computer systems 100, and the teachings of this invention are not to be construed to be limited in any way to the specific architecture depicted in FIG. 11.

The computer program code 101 that implements the presently preferred processes and methods can be stored in one or more of the memories (e.g. 106, 108) and executed by one or more of the CPUs 104. In a presently preferred embodiment of this invention the program 101, which is embodied on a computer readable media, such as disk and/or semiconductor memory, includes an interface to the feature extractor (FE) 12, and incorporates the events analyzer subsystem (EAS) 14, the automatic query generation subsystem (AQGS) 18 and the data assembly, rank and Kilter subsystem (DARFS) 20, which cooperate as described above to generate either locally or at some other location the multiplexed information stream that contains the collateral information.

Based on the foregoing it can be appreciated that when the database 28 is searched for documents that a document may comprise text, such as a single word, a sentence, a group of sentences, or an image of a page; or the document can comprise a multimedia object and may contain an audio file, an image file, an audio/video clip, a Web page with or without hyperlinks to other Web pages, and so forth.

Thus, while the invention has been particularly shown and described with respect to preferred embodiments thereof, it will be understood by those skilled in the art that changes in form and details may be made therein without departing from the scope and spirit of the invention. For example, the system 10 could be modified by including more or less and different types of feature extractors 12 and event analyzers 14, as well as different numbers and types of databases 28. These teachings are not to be construed to be limited to only the real-time analysis of news broadcasts, as other types of programming such as, but not limited to, documentaries and biographies can also benefit from the insertion of collateral information into the programming stream, as can other types of information streams besides broadcast audio/video streams. For example, in a purely audio broadcast stream it may be possible to annotate the audio presentation with a video presentation of the collateral information. Furthermore, and for the case where the audio/visual source 1 of FIG. 1 is used to capture a meeting or some other assembly of persons, the results of the operation of the system, i.e., the generated collateral data or information, can be presented to the participants in real-time, as well as optionally multiplexed into the original audio/visual stream and optionally archived for future use. The teachings of this invention are also not to be construed as requiring that the processing be performed in real-time or substantially real-time, as in some applications it may be acceptable to time delay the information stream so as to enable the system 10 more time to perform its various operations.

Thus, the teachings of this invention should not be construed to be limited to only the above-described embodiments and examples, but should be given a scope that is commensurate with the scope of the appended claims.

What is claimed is:

1. A method for providing collateral information for inclusion with an information stream, comprising steps of:
    examining the information stream to recognize a presence of events that occur in the information stream, wherein said events are derived from the information stream based on one or more predetermined taxonomies, wherein the step of examining the information stream comprises the steps of automatically extracting text from the information stream, segmenting the text into sentences and a step of operating on the sentences to identify topics that correspond to topic taxonomies of the predetermined taxonomies and the presence of names of entities;
    assembling a list comprised of an identified topic having a start time and an end time, as well as any named entities that occur between the start time and the end time;
    assembling a query object comprised of named entities that occur between the start time and the end time of the identified topic;
    searching at least one database to identify a first set of stored documents that correspond to the topic;
    identifying a subset of the first set of documents that contain the named entities;
    identifying a second set of documents that correspond to words found in the text;
    scoring the returned documents based on a plurality of criteria and ranking the documents based on their scores;
    automatically generating database queries from said derived events; and
    analyzing results of said database queries so as to rank and select said results to be inserted into the information stream as information that is collateral to said derived events.

2. A method as in claim 1, wherein the plurality of criteria comprise a score derived from a free text search of the database using text that is automatically extracted from the information stream, on a number of named entities appearing in the text and in the database query results, and on a taxonomy path score, where the taxonomy path score represents an amount of relatedness between a taxonomy-related information element found in the text and a tree of the predetermined taxonomies.

3. A method as in claim 1, wherein the step of automatically extracting text from the information stream comprises a step of operating a voice recognition system.

4. A method as in claim 1, wherein the step of automatically extracting text from the information stream comprises a step of extracting closed caption text.

5. A method as in claim 1, wherein the step of automatically extracting text from the information stream comprises a step of operating a character recognition system.

6. A method as in claim 1, wherein the step of automatically extracting text from the information stream comprises a step of also generating text that is descriptive of a number of human faces that are present in an image conveyed by the information stream.

7. A method for providing collateral information for multiplexing with an information stream, comprising steps of:
    converting the information stream into text;
    analyzing the text to identify information elements based on one or more predetermined taxonomies;
    automatically generating queries from the information elements for searching at least one database;
    extracting data from database search results that is relevant to the information stream, wherein the step of extracting comprises a step of ranking extracted document information based on a score derived from a free text search of a document database using the text, on a number of named entities extracted from the text that are found in the documents, and on a taxonomy path score, where the taxonomy path score represents an amount of relatedness between a taxonomy-related information element identified in the text and a tree of the predetermined taxonomies; and
    multiplexing the data into the information stream for presentation at a destination of the information stream.

8. A method as in claim 7, wherein the queries are generated based on information elements that correspond to a list of information elements identifying topics in the text being analyzed, where the topics correspond to topic taxonomies of the predetermined taxonomies.

9. A method as in claim 7, wherein the step of analyzing the text comprises steps of segmenting the text into sentences and a step of operating on the sentences to identify topics that correspond to topic taxonomies of the predetermined taxonomies, and wherein the step of automatically generating queries operates on identified topics.

10. A system for providing collateral information for inclusion with an information stream, said system operating in real time or substantially real time and comprising:

a subsystem for examining the information stream to recognize a presence of events that occur in the information stream, wherein said events are derived from the information stream based on one or more predetermined taxonomies;

a subsystem, having an input coupled to an output of said examination subsystem, for automatically generating database queries from said derived events;

a database for receiving said database queries; and a subsystem, having an input coupled to an output of said database, for analyzing results of said database queries so as to rank and select said results to be inserted into the information stream as information that is collateral to said derived events, wherein the analyzing subsystem employs ranking criteria comprised of a score derived from a free text search of the database using text that is automatically extracted from the information stream, on a number of named entities appearing in the text and in the database query results, and on a taxonomy path score, where the taxonomy path score represents an amount of relatedness between a taxonomy-related information element found in the text and a tree of the predetermined taxonomies, and wherein the query generation subsystem generates queries based on information corresponding to a list that identifies topics in the text that is automatically extracted from the information stream, where the topics correspond to elements of the taxonomy tree.

11. A system as in claim 10, wherein said examining subsystem comprises at least one unit for automatically extracting text from the information stream, a unit for segmenting the text into sentences and at least one unit for operating on the sentences to identify topics that correspond to topic taxonomies of the predetermined taxonomies, wherein said query generation subsystem automatically generates database queries based at least in part on identified topics.

12. A system as in claim 11, wherein said text extracting unit comprises at least one of a voice recognition system, a system for extracting closed caption text, and a character recognition system.

13. A system as in claim 11, wherein said examining subsystem comprises a unit for generating text that is descriptive of a number of human faces that are present in an image conveyed by the information stream.

14. A system for providing collateral information for inclusion with an information stream, said system operating in real time or substantially real time and comprising:

a subsystem for examining the information stream to recognize a presence of events that occur in the information stream, wherein said events are derived from the information stream based on one or more predetermined taxonomies, wherein said examining subsystem comprises at least one unit for automatically extracting text from the information stream, a unit for segmenting the text into sentences and at least one unit for operating on the sentences to identify topics that correspond to topic taxonomies of the predetermined taxonomies;

a subsystem, having an input coupled to an output of said examination subsystem, for automatically generating database queries from said derived events, wherein said query generation subsystem automatically generates database queries based at least in part on identified topics;

a database for receiving said database queries;

a subsystem, having an input coupled to an output of said database, for analyzing results of said database queries so as to rank and select said results to be inserted into the information stream as information that is collateral to said derived event; and a unit for operating on the sentences to identify the presence of names of entities, and further comprising a unit for assembling a list comprised of an identified topic having a start time and an end time, as well as any named entities that occur between the start time and the end time, and where the query generation subsystem assembles a query object comprised of named entities that occur between the start time and the end time of the identified topic for searching said database to identify a first set of stored documents that correspond to the topic, a subset of the first set of documents that contain the named entities, a second set of documents that correspond to words found in the text; and where said analyzing subsystem scores the returned documents based on a plurality of criteria and ranks the documents based on their scores.

15. A computer readable media having recorded thereon a program for providing collateral information for inclusion with an information stream, the program comprising instructions for:

examining the information stream to recognize a presence of events that occur in the information stream, wherein the events are derived from the information stream based on one or more predetermined taxonomies, wherein the instruction for examining the information stream comprises instructions for automatically extracting text from the information stream, for segmenting the text into sentences and for operating on the sentences to identify topics that correspond to topic taxonomies of the predetermined taxonomies and the presence of names of entities;

assembling a list comprised of an identified topic having a start time and an end time, as well as any named entities that occur between the start time and the end time;

assembling a query object comprised of named entities that occur between the start time and the end time of the identified topic;

searching at least one database to identify a first set of stored documents that correspond to the topic;

identifying a subset of the first set of documents that contain the named entities;

identifying a second set of documents that correspond to words found in the text;

scoring the returned documents based on a plurality of criteria and ranking the documents based on their scores;

automatically generating database queries from said derived events; and analyzing results of said database queries so as to rank and select said results to be inserted into the information stream as information that is collateral to said derived events.

* * * * *